United States Patent [19]

Leuenberger et al.

[11] 4,346,445
[45] Aug. 24, 1982

[54] PORTABLE ALPHANUMERIC AND SYMBOL DRAFTING DEVICE

[75] Inventors: Jean P. Leuenberger, Bethlehem, Pa.; David J. Logan, Glastonbury; Clifford A. Scorso, Jr., Bolton, both of Conn.

[73] Assignee: KOH-I-NOOR Rapidograph, Bloomsbury, N.J.

[21] Appl. No.: 127,663

[22] Filed: Mar. 6, 1980

[51] Int. Cl.³ .................. G05B 19/19; G06F 3/13
[52] U.S. Cl. ........................... 364/520; 33/18 R
[58] Field of Search .............. 364/518, 519, 520; 318/575; 33/32 C, 434, 18 R

[56] References Cited

U.S. PATENT DOCUMENTS

| | | | |
|---|---|---|---|
| 3,182,126 | 5/1965 | Ascoli | 178/30 |
| 3,293,651 | 12/1966 | Gerber et al. | 346/29 |
| 3,349,176 | 10/1967 | Ascoli | |
| 3,422,325 | 1/1969 | Gerber et al. | 318/18 |
| 3,449,754 | 6/1969 | Stutz | 346/29 |
| 3,473,009 | 10/1969 | Gerber et al. | 364/520 X |
| 3,544,972 | 12/1970 | Trousedale | 340/172.5 |
| 3,555,254 | 1/1971 | Gerber | 364/520 X |
| 3,573,842 | 4/1971 | Colpitts | 346/29 |
| 3,609,315 | 9/1971 | Rogers | 364/520 X |
| 3,636,328 | 1/1972 | Korelitz et al. | 364/520 X |
| 3,696,388 | 12/1970 | Eichelberger | 340/324 A |
| 3,716,705 | 2/1973 | Newell | 235/151 |
| 3,757,095 | 9/1973 | Kiwiet | 235/151.11 |
| 3,809,868 | 5/1974 | Villalobos et al. | 235/151 |
| 3,821,524 | 6/1974 | Wahl | 235/151 |
| 3,838,258 | 9/1974 | Logan | 235/151.11 |
| 3,845,285 | 10/1974 | Leroy | 235/151 |
| 3,887,796 | 6/1975 | Trousedale et al. | 255/151 |
| 3,893,616 | 7/1975 | Trousedale | 235/151 |
| 3,900,853 | 8/1975 | White | 346/139 R |
| 4,058,849 | 11/1977 | Fitzgerald et al. | 364/520 |
| 4,062,648 | 12/1977 | Hennessee | 364/520 X |
| 4,135,245 | 1/1979 | Kemplin et al. | 364/520 |
| 4,150,902 | 4/1979 | Brescia | 400/17 |
| 4,173,020 | 10/1979 | Anderka et al. | 346/140 |
| 4,197,550 | 4/1980 | Held | 346/29 |

FOREIGN PATENT DOCUMENTS

| | | |
|---|---|---|
| 1211802 | 3/1966 | Fed. Rep. of Germany . |
| 1295858 | 5/1969 | Fed. Rep. of Germany . |
| 1486927 | 3/1972 | Fed. Rep. of Germany . |
| 2724855 | 12/1978 | Fed. Rep. of Germany . |
| 1366253 | 9/1974 | United Kingdom . |

OTHER PUBLICATIONS

Datascribe II Brochure, Alpha Merics, Van Nuys, California 91406, 5/79.

*Primary Examiner*—Jerry Smith
*Attorney, Agent, or Firm*—David H. Semmes; Warren E. Olsen

[57] ABSTRACT

A portable alphanumeric and symbol drafting device which essentially comprises a mechanically functioning keyboard unit, which is flexibly connected to an electronics package unit. Accordingly, the keyboard unit, which preferably weighs on the order of only two pounds, comprises a singularly useful device for a draftsman, since it allows a string of characters to be most accurately applied upon a drawing surface, by manipulation of only the keyboard unit. The keyboard unit may also include an attachment for mating with a standard parallel-arm drawing device. The keyboard unit comprises a first longitudinal edge, which is used to establish an origin or base line for the string of characters to be lettered and includes a carriage means for supporting a drafting pen in a manner to allow it to be operably controlled for a longitudinal (x-axis) and transverse (y-axis) movement proximate this first longitudinal edge of the housing. The x-axis travel is approximately eight inches, and the y-axis travel is approximately one inch, and the keyboard unit is capable of accurately producing a string of alphanumeric characters, or symbols, in a sequential manner within this size envelope. The electronics package has storing memory means for holding addressable, numerical instructions for vocabulary of characters, which are addressed by receiving character input signals from the keyboard. Scale means operate upon the digitized character instructions, whereby a character symbol can be accurately drawn, (up to approximately one inch in height,) without requiring any change of the digitized instructions in the vocabulary storing memory means.

19 Claims, 16 Drawing Figures

PORTABLE ALPHANUMERIC AND SYMBOL DRAFTING DEVICE

BACKGROUND OF THE INVENTION

Accurate alphanumeric and symbol drafting control elements are commonly used in large-scale plotting devices, and a number of exemplary table and drum plotters are currently manufactured by The Gerber Scientific Instrument Company, of Hartford, Connecticut. Such known plotters, while very large and expensive, are most accurate and capable of producing alphanumeric and symbol devices on a platen, as part of a general x and y plotting ability, over very large surface areas.

The present invention is categorically a uniquely portable character/symbol drafting device, for the particular purpose of allowing an individual draftsman to quickly place the instrument upon a drafting surface, and then accurately make an ink trace of alphanumeric and symbol indicia. The present device is primarily a lettering device for producing a single string of characters of symbols, in variable sizes, directly upon any part of a drawing. The present invention performs small-scale ink traces very accurately, since the primary object is to achieve quality reproductions of letter and symbols, without the encumbrance of a large lettering table device. Accordingly, it is the primary object of the present invention to provide a portable unit which will allow any number of character font styles to be easily and accurately reproduced, in response to a keyboard input upon a portable unit. Portability is significantly enhanced in the preferred embodiment by the fact that the electronics, both control and vocabulary memory cartridges, are remotely located in a separate electronics package, with interconnection to the keyboard unit by only a flexible cable. It is a very related subject of the present invention to produce alphanumeric characters and symbols which are characterized with a quality equal to any produced by large-scale plotting devices, and further to be able to quickly change vocabulary font styles, and the outputted letter size for any given font. For this purpose, the present invention teaches a manner of using a replaceable ROM module, containing a complete vocabulary, with each character being digitized according to a uniform matrix. Further objects and advantages of the present invention will become more apparent from the following summary.

SUMMARY OF THE INVENTION

According to the present invention, the preferred embodiment portable alphanumeric and symbol drafting device comprises a light weight, small keyboard unit which is flexibly connected to a separate electronics package unit. The invention is capable of accurately producing alphanumeric characters or symbols, with full spacing and dimensional inter-relationships being reproducable despite the scale of the desired letters chosen.

The keyboard unit essentially comprises a portable housing with a first longitudinal edge which can be used by the draftsman in a simple fashion, to align an origin or base line upon which he desires a character string to be applied, on a drawing surface. The keyboard has a lower surface adapted to be supported directly on the drafting surface and an upper surface which essentially comprises a keyboard means for inputting one or more characters or symbols to define the desired character string. Within the keyboard unit, and proximate the first longitudinal edge, there is a carriage means for supporting a drafting element, preferably a technical pen, which is able to be moved in a longitudinal (x) and transverse (y) manner by motors which respond to drawing control signals generated within the electronics package unit. There is also supplied a device for raising and lowering the pen, in a z direction, so that a non-writing mode is possible.

The electronics package unit further comprises storing memory means for holding addressable, numerical instructions for an entire vocabulary of characters with means for receiving a character input from the keyboard means, and addressing means for recalling the previously-stored numerical instructions corresponding to each of said characters. The electronics package further includes scale means to operate upon the outputted digitized character instructions in order to ultimately change the scale of a character representation as it is actually executed by the pen on the carriage within the separate keyboard unit.

A particularly novel aspect of the present invention is a first carriage comprising a planar, T-square shaped member disposed generally parallel to said longitudinal edge of the keyboard unit housing, and supporting thereon an x-axis dc servo motor and encoder assembly. The entire T-square and x-axis dc servo motor combination is moved, in a y-direction, by a second dc servo motor and encoder assembly which is mounted to a base reference of the keyboard housing. First and second aspects of the control signal from the electronics package control these x and y axis motors, and identical backlash-free nuts on lead-screws are employed to most accurately locate the pen in an x and y reference. A second, or pen carriage assembly sits, in a sliding bearing fashion, upon the T-square, and is moved thereupon by the x-axis motor and encoder assembly.

The longitudinal edge of a keyboard unit is approximately eight inches in length, and the y-axis motion allowed is on the order of one inch. Hence, a string of characters can be simultaneously input to occupy this region, with the pen then sequentially tracing each letter into that region. The preferred embodiment employs a technical drafting pen having a stylus point, and line quality is significantly enhanced, in the preferred embodiment, by employing a digitizing technique for each letter which ensures a constant velocity of pen travel. In this fashion, line values are maintained constant for all portions of a letter, since there is no opportunity for a line value to change, due to loiter time at any given point on the trace of the alphanumeric character or symbol.

Further features and objects of the present invention will be apparent from a detailed description of a preferred embodiment, wherein reference is made to the accompanying drawings for substantial disclosure, particularly with respect to an exemplary software program within the electronics package unit.

BRIEF DESCRIPTION OF THE DRAWINGS

To illustrate certain essential characteristics of the invention, with respect to the following detailed description of the preferred embodiment, reference should be had to the accompanying drawings, wherein.

DETAILED DESCRIPTION OF THE PREFERRED EMBODIMENT

The present invention essentially comprises a portable keyboard unit, and a separate, more stationary electronics package unit. Accordingly, and in view of the fact that there is novelty both in the mechanical design of the keyboard unit, as well as in the electronics and logic approach within the electronics unit, each major component of the system will now be treated in order.

Figure 1:
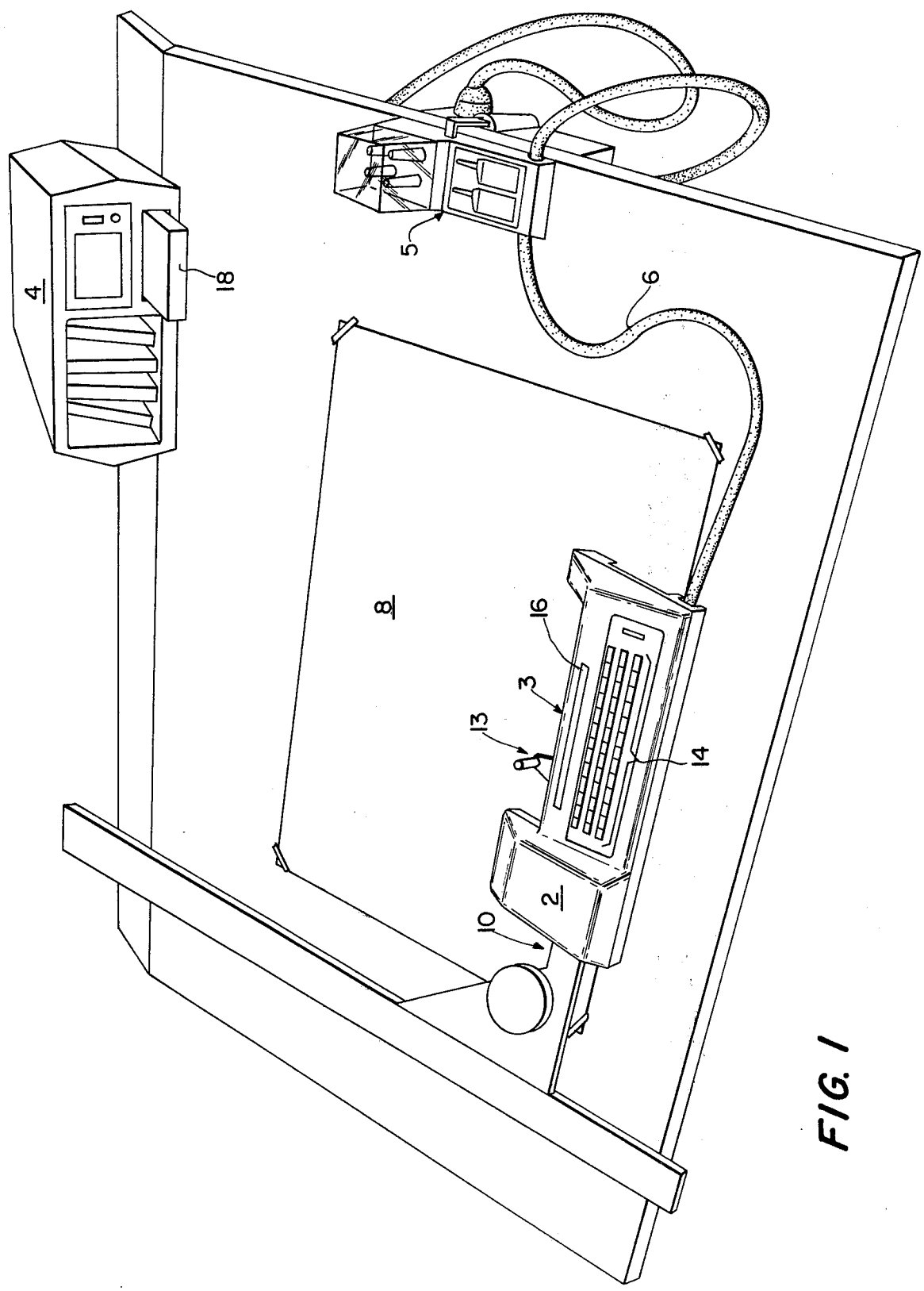
FIG. 1 is a perspective pen view, showing the keyboard unit and the electronics unit in an operating position upon a drafting table surface.

FIG. 1 illustrates the basic combination to comprise a keyboard unit, 2, and an electronics package unit, 4, with electrical interconnections therebetween by a flexible, interconnect cord, 6. FIG. 1 also shows an optional pen holder assembly, 5. The keyboard unit is a portable housing with a first longitudinal edge, 3 which extends along a front-most portion, as illustrated. The lower surface of the keyboard unit is adapted to be placed upon the indicated drafting surface 8, to enable the drafting pen, 13, to trace a string of characters in a desired position upon the flat drafting surface. The upper surface of the unit comprises a keyboard means, 14, which allows the operator to easily input at least one character or symbol, with the inputs being shown by an LED display, 16. The portability of the keyboard unit, 2, may further be enhanced by interconnecting the keyboard unit with a conventional parallel-arm drafting machine, as by the indicated bracket, 10. In this fashion, the draftsman may do all the lettering on his drafting surface, 8, by simply moving his parallel arm machine in the same fashion that he would move a scale or other accessory. The flexible interconnect cord, 6, allows the keyboard unit to be placed in any remote position with respect to the electronics package, 4, and also, significantly, enables the keyboard unit to be minimized in both size and weight. In the preferred embodiment, described hereinafter, the keyboard unit weighs only approximately two pounds, and has an overall dimension on the order of approximately sixteen inches, in the longitudinal direction, and approximately six inches in the transverse direction.

Figure 2:
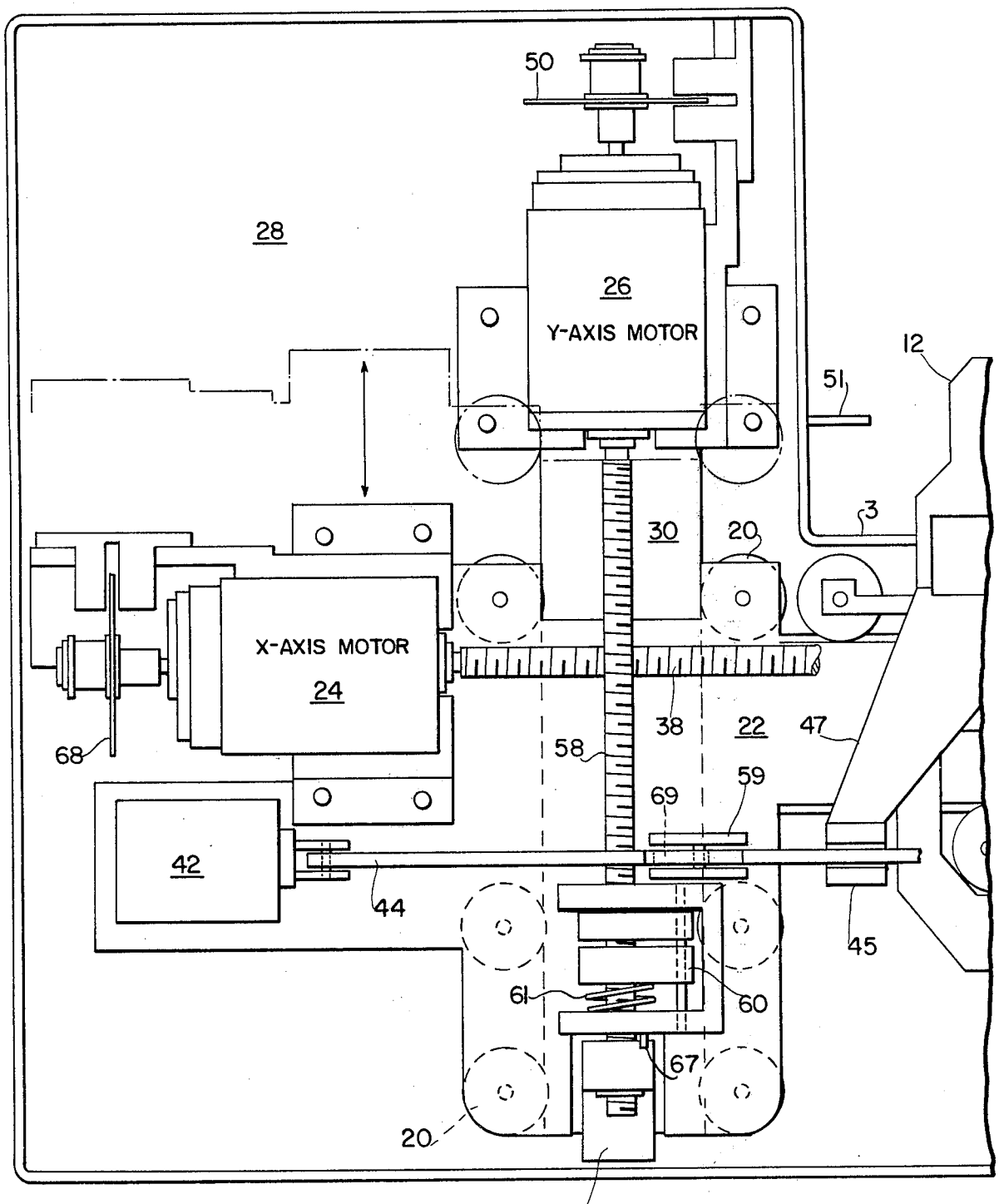
FIG. 2 is a top plan view, in partial section, showing the major mechanical control units of the keyboard unit.

Having now described the essential elements of the device taught herein, reference may now be had to the mechanical design features of the keyboard unit by reference to FIGS. 2-8, inclusive. A top plan view, in partial section, is shown in FIG. 2, with the basic mechanical features substantially illustrated. For reference purposes the designators "left" and "right" will be used with reference to FIG. 1, with the front being the upper surface as illustrated in FIG. 1. The most significant mechanical aspect of the keyboard unit is the T-square, 22, which supports the entire mechanism which enables movement of the drafting pen in the x direction. The T-square, 22, supports an x-axis motor, 24, and an associated lead-screw which effectuates x-axis movement, i.e., in a longitudinal direction, of the pen holder assembly, 12. A y-axis motor, 26, drives the entire assembly of T-square, 22, and associated x-axis operators, in the transverse direction, as shown in FIG. 2. The housing has a base plate, 28, upon which the y-axis motor is secured. Movement of the T-square, 22, in the y-axis direction, is illustrated in broken line in FIG. 2 for further understanding. A guideway for this y-axis movement is provided by the y-axis guidebar, 30, with this y-axis motion being accomplished by rotation of the y-axis lead-screw, 58, to engage with a y-axis preload nut assembly, 60. In order to accurately locate the T-square unit, a plurality of y-axis roller bearings, 20, are illustrated in FIG. 2, wherein four of such roller bearings are shown (in two positions) to engage the transversely extending sides of the y-axis guidebar 30.

Figure 5:
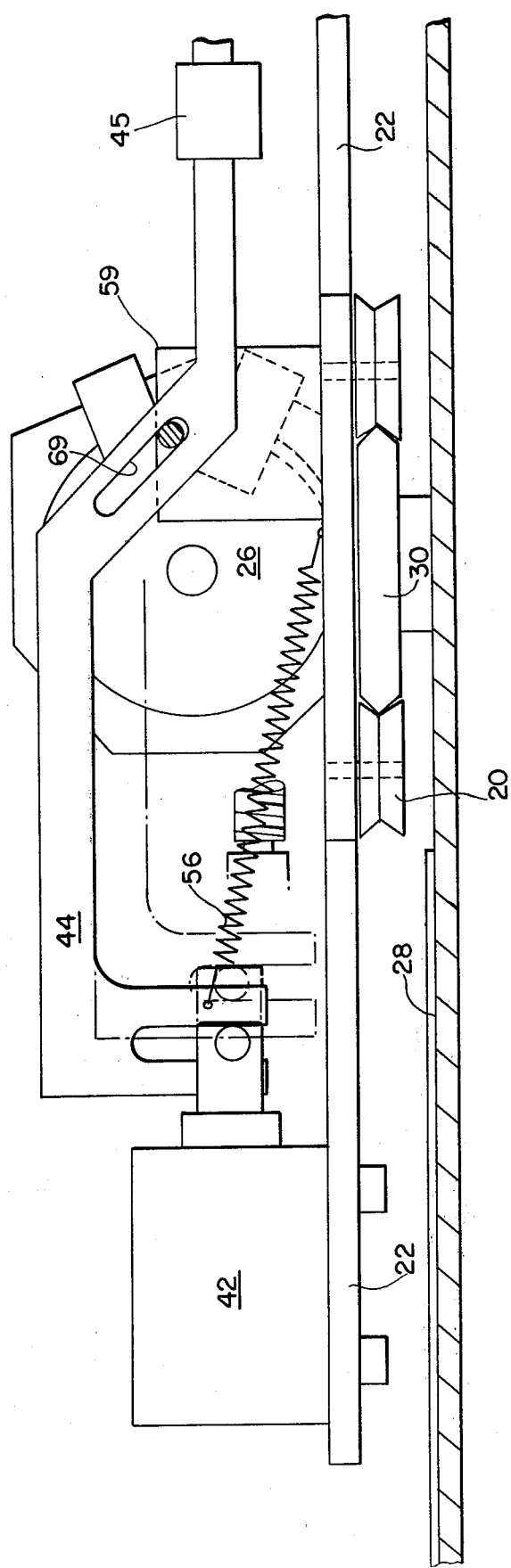
FIG. 5 is a rear elevation view, in partial section, of the keyboard unit.
Figure 8:
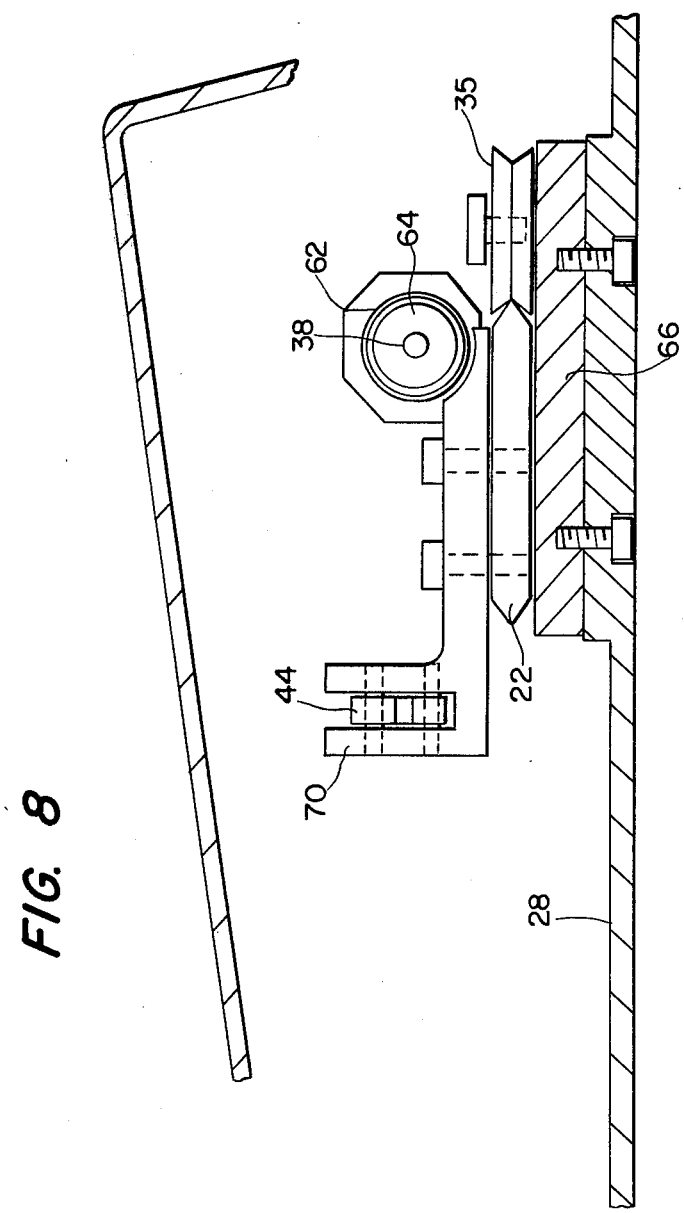
FIG. 8 is a right side elevation view, in partial section, of the keyboard unit.

Also supported upon the T-square, 22, is a solenoid, 42, which is used to control z-direction motion of a pen, 13, within the penholder assembly, 12. The solenoid, 42, activates a liftbar, 44, which comprises a 45° angle slot, 69, to engage a stationary guide, 59 (FIG. 5). The pen is normally in a raised position, and to lower the pen, in a z-direction, the solenoid is energized, thereby pulling a lift bar towards the left, and stretching the spring, 56 (see FIG. 5). The guidebar, 44, is accurately raised along its entire longitudinal length, by a second guide, 70, which is similar to guide 59 (FIG. 8). A biasing spring, 49, urges the lever arm, 47, upwards, and the pen, 13, is thereby urged downwardly against the paper. As shown between FIGS. 5 and 8, the guidebar, 44, extends the entire longitudinal extent of x-axis travel. Hence, the up-down mechanism is effective irrespective of any relative position of the control lever, 47, along the x-axis. As shown most clearly in FIG. 3, the pivotable penholder assembly, 12, is hinged through a pin and bearing, 36, to the x-axis carriage assembly, 32, which is supported for longitudinal movement on the T-square, 22, by three roller bearings. Roller bearings, 34 and 35 engage a v-shaped groove of the longitudinal extending portion of the planar T-square, with tensioning of the entire carriage, 32, being accomplished by a spring-loaded roller bearing, 46. The x-axis carriage travels along the T-square in response to rotation of the x-axis lead screw, 38, which contacts the pre-load nut assembly, 40, as shown most clearly in FIG. 3. This pre-load nut configuration, 40, allows for some misalignment which may exist between the lead-screw, 38, the x-axis carriage, 32, the x-axis motor, 24 and the associated x-axis encoder assembly, 68. Motion is transferred to the carriage, 32, by two pre-load nuts, (40, 43) which are urged together by a spring 41. Hence, as the carriage moves away from the motor, motion is transferred to the x-axis carriage through the nut, 40, and spring, 41, while motion of the carriage, 32, towards the x-axis motor is accomplished by the pre-load nut assembly, 43, pushing directly against the x-axis carriage. These nut are accurately machined, and pre-loaded by spring, 41, to eliminate backlash effects between the nuts and the lead-screw. In the preferred embodiment the x-axis lead-screw, 38, as well as the y-axis lead-screw, 68, are of a very fine pitch, such as 24 threads per inch.

Figure 3:
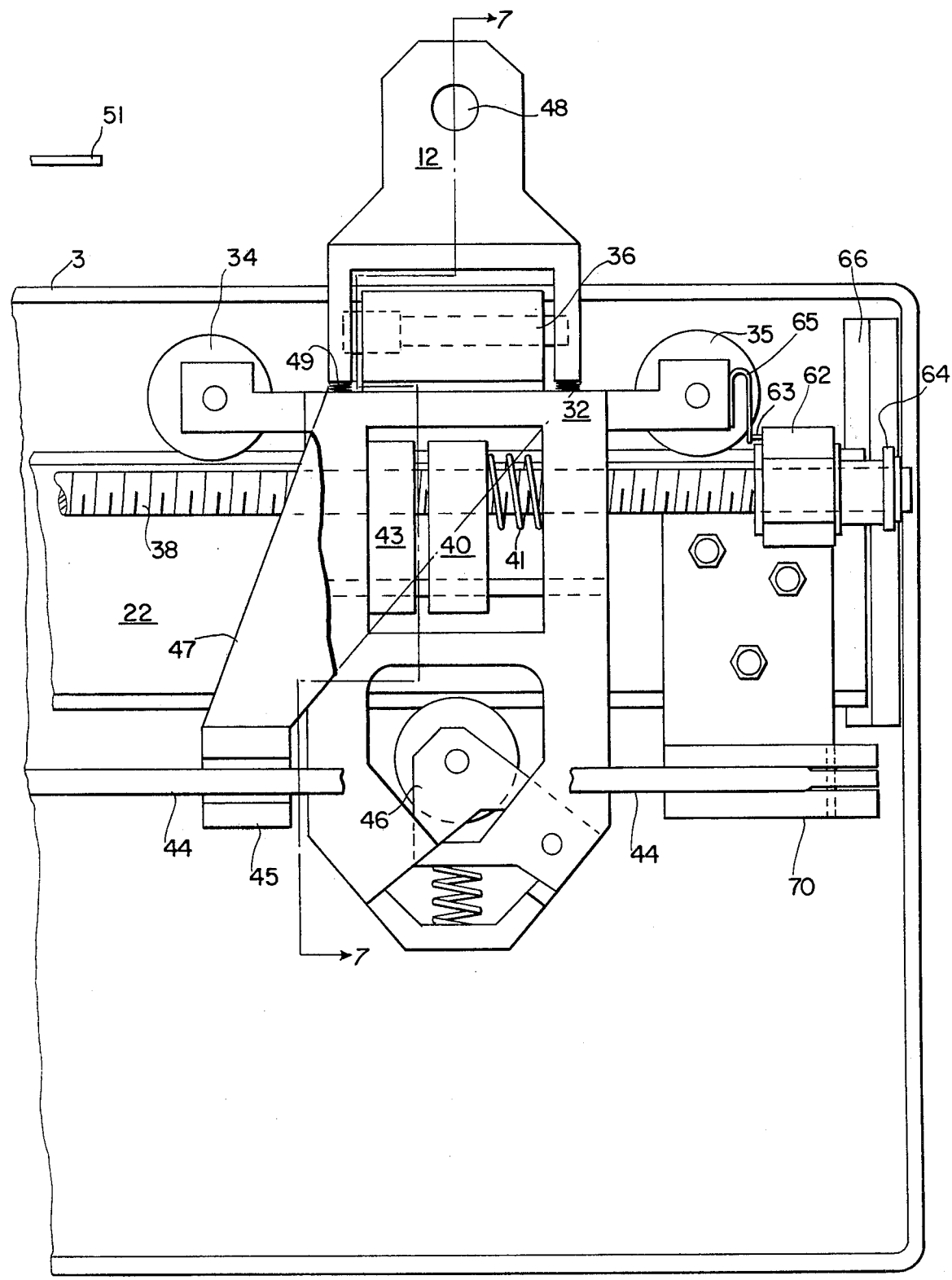
FIG. 3 is a detailed plan view showing the x-axis carriage on the T-square.
Figure 7:
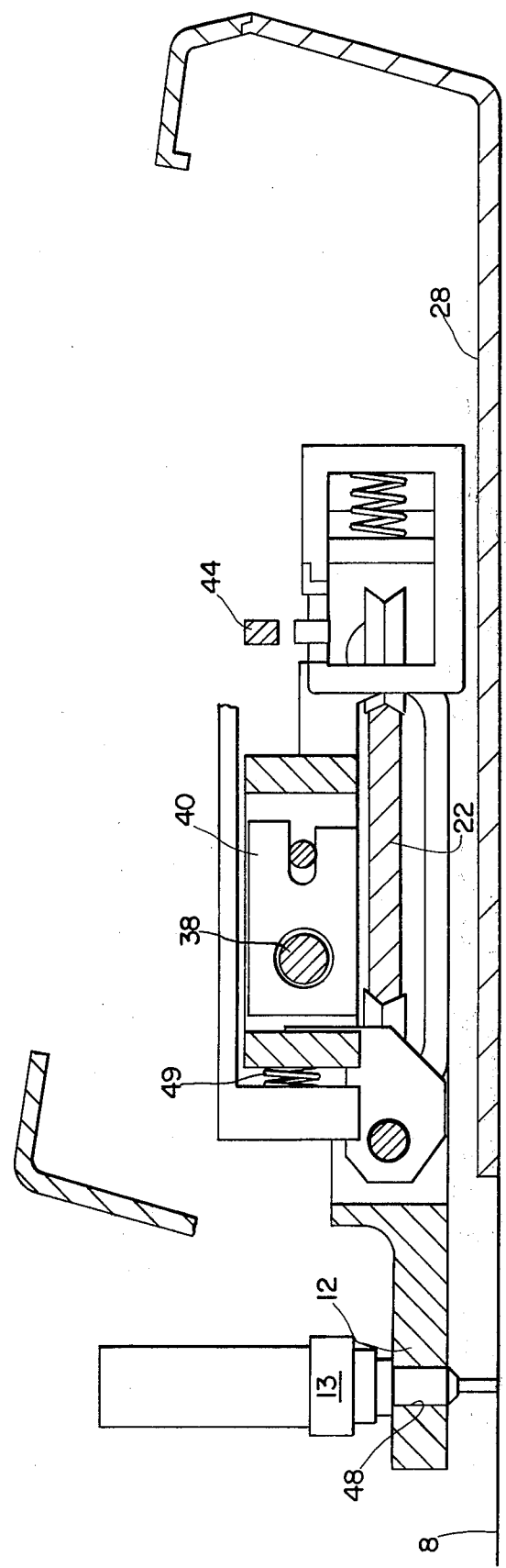
FIG. 7 is an elevation sectional view, along the section line 7—7 of FIG. 3, showing details of the x-axis carriage, in partial section.

In FIG. 3 the pen carriage, 32, is shown in a right-most position of travel, with the x-axis lead-screw end support, 62 being visible. The x-axis lead-screw is held in the end support by a spring load end cap, 64. Appropriate limit switches are located, for example, at 63, on the end support, 62, to indicate a contact with spring contact, 65, of the carriage, 32. Various microswitches are well known for this purpose. Having now discussed relative x-axis motion of the pen carriage, it should be noted that the T-square, 22, supports this entire assembly, and itself moves this entire assembly in the y-axis direction, with an appropriate end support at the right end, as shown at FIG. 8. In FIG. 8 a support block, 66, is shown with the T-square, 22, (in section) being located at a relatively rear-most position. The support block 66 is sufficiently long, in the transverse direction, to accommodate the approximately one inch y-axis travel which is required of the entire T-square assembly, in performing the writing function. For further appreciation of the fact that the T-square, 22, supports this entire x-axis movement as a unitary assembly, FIG. 7 shows, in elevation view, a partial section along the section line 7—7 as that section line is indicated in FIG. 3. Since the pen up/down actuator bar, 44, extends the entire longitudinal length of the key unit, there is always available an actuation to lower the pen, through overcoming the action of a z-axis compression spring, 49, which urges the penholder assembly, 12, to rotate, downwardly, about the pen and bearing assembly, 36 (FIG. 3). In this fashion, a technical drafting pen which is inserted through the mounting thread 48, will be urged with a predetermined force against the drafting surface. As hereinabove noted, the software controls x and y movement for a constant velocity, and constant downward pressure, by spring, 49, encourages high quality, constant width ink traces.

Figure 4:
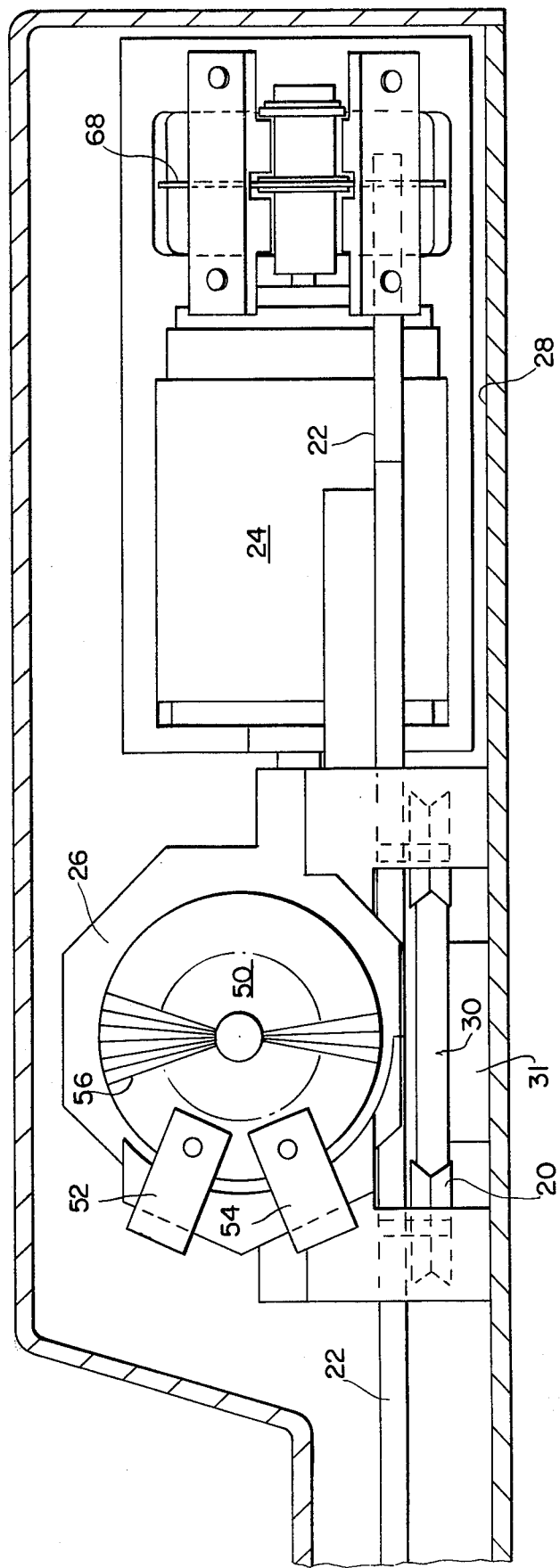
FIG. 4 is a front elevation view, in partial section, of the keyboard unit.

FIG. 4 further illustrates that the T-square, 22, is the sole support for the x-axis motor, 24, and its associated encoder assembly, 68. One may practice the invention with combined x-axis motor and encoder assemblies, as available from Portescap of Switzerland. FIG. 4 further illustrates the y-axis motor, 26, which is mounted to a housing reference base, 28, with an identical form of encoder assembly. Each of the motors is directly attached to an encoder disc. For example, FIG. 4 illustrates that the y-axis encoder disc is divided, radially, into approximately 80 lines or divisions. Hence, the disc includes 80 transparent segments and 80 opaque segments, which function to interrupt the light sources of the pair of photo interrupters, 52 and 54. Such encoders are used to develop position and velocity information, and are per se known for this purpose, insofar as dc servo motors are commonly used for exactly positioning lead-screws. It should be noted that use of an 80-line disc, and a 24 thread per inch lead-screw for both the x and y axis, enables one resolution of the disc to translate into approximately a 0.0005 inch increment of linear travel, in either the x or y direction.

Accordingly, the preferred embodiment has an x or y position resolution on the order of approximately 0.0005 inches. Further features, and the exact control of these encoders and motors within the present invention will become more apparent, hereinafter.

Limit switches, such as right and x-axis limit switch, 63, (FIG. 3), are located at both ends of each lead-screw, so that contact by an element on the pen carriage serves both to supply a limit stop information, and also to assist in locating the pen at an origin position. Spring flippers, such as that shown at 65 (FIG. 3), are conventionally used to actuate microswitches for that purpose.

Having now described actuation of the x-axis carriage along the T-square, 22, it should be appreciated that the y-axis actuation results from similar dc servo motor and encoder control. The y-axis servo motor, 26, is mounted directly to a housing reference plate, 28, and also includes a pre-loaded nut assembly, 60, which is the y-axis force transfer connection to the T-square assembly. The y-axis lead-screw 58 is supported, with respect to the housing, 28, by a spring-loaded end support 65, which also includes microswitches, such as at 67, to limit the y-axis travel, and allow for origining.

Figure 6:
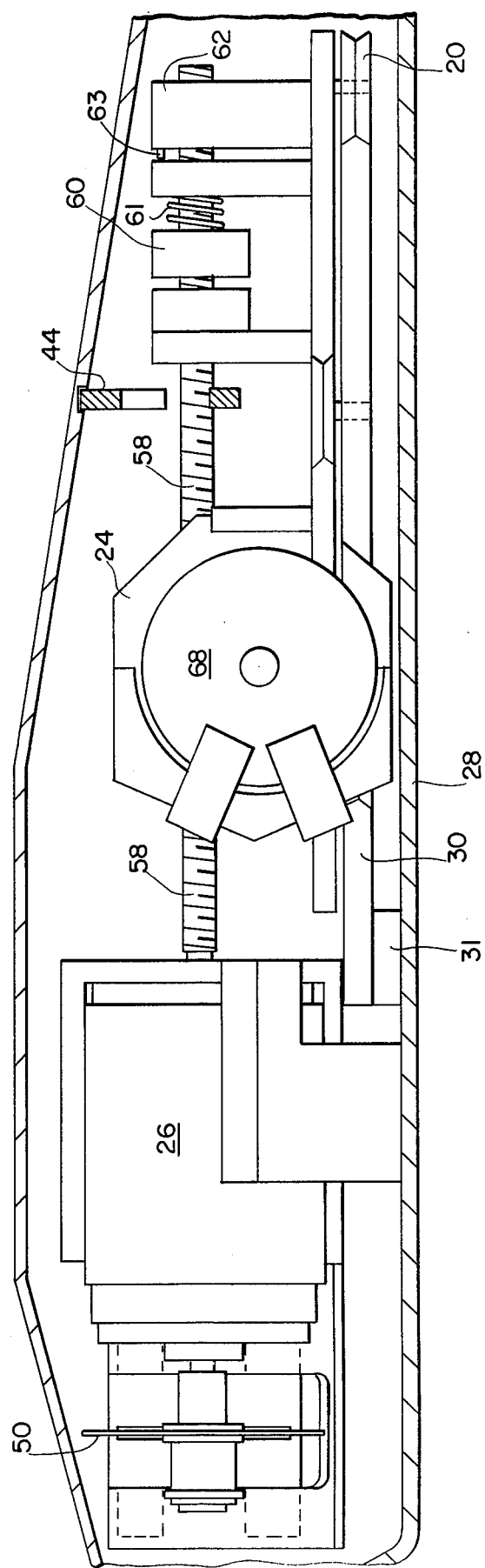
FIG. 6 is an elevation view of the left side of the keyboard unit.

The y-way guidebar, 30, is spaced above the reference plate, 28, as by spacers 31, (FIG. 4), so that the roller bearings, 20, may ensure a free and exact travel of the entire T-square, 22, upon the y-guide, 30. FIG. 6 illustrates a left side elevation view, in partial section, and the y-axis lead-screw being urged against the pre-load nut assembly, 60, by the spring, 61, in a fashion entirely analogous to the x-axis pre-load nut, 40, as discussed hereinabove.

Use of the keyboard mechanism requires the operator simply to position the upper longitudinal edge, 3, (FIG. 2) in a manner so that a general region for the character string to be printed will be defined. For example, a cursor, such as a line or string, 51, can also be employed to define a longitudinally extending origin for the base line of the character string to be drawn. Pens especially designed for automatic drafting machines, are available from Koh-I-Noor Rapidograph, Inc., of Bloomsbury, N.J. and commonly include a jeweled point for such high-speed applications. Also available from Koh-I-Noor Rapidograph, Inc. are spring-loaded pen assemblies, which exert a particular force of the pen tip against the writing medium, and such may also be used in the present device. The LED display, 16, is capable of displaying 32 characters or symbols as one string, and an eight inch longitudinal line is allowed by this preferred embodiment. For a letter height of ten millimeters, 23 characters are accommodated as one input string. Of course, at smaller scales more characters would fit in the line. A maximum eight inch x-axis travel, and a one inch y-axis travel, have been chosen as a good optimization for drafting applications, and a "no print" can be used to test the length of an initially chosen size for a string.

Having described the basic mechanical features of the keyboard unit, now follows the discussion of the preferred electronics which are separately held in the electronics package unit, 4, and which control the mechanical functioning of the keyboard unit. At this point it should be emphasized that the electrical design is predicated upon a technique sensitive to a need for varying the size of alphanumeric characters or symbols in a font and hence, accuracy in the plotting requires extremely fine slope resolution. As discussed in more detail hereinafter, the present invention employs a microprocessor and interchangeable ROM memories, 18, (FIG. 1) so that a given vocabulary can be simply replaced in this electronics unit. High quality lettering with an easily portable keyboard unit, is the ultimate object of the present invention, and it is critical to determine a vector size, in a digitizing technique, which will provide the appropriate quality. In view of the extreme accuracy of the lead-screw designs in the keyboard, in the x and y directions, quality of the finished drawn character will substantially depend upon the accuracy of the digitizing of each character within any given alphabet. An input sent through the keyboard, 16, goes to a keyboard encoder, which in turn has an output which is a coded signal for that character to be printed, as that character is stored in digital form within a ROM, for example, 18 (FIG. 1). At the heart of the electronics unit is a microprocessor, which in the preferred prototype embodiment is a single component, 8-bit microcomputer, of the MCS 48 series, as offered by Intel Corporation of Santa Clara, Calif. Development work was accomplished with a Intel 8048 mask programmable ROM microprocessor, which includes 1K×8ROM-memory, 64 BYTES RAM and 27 input/output lines. The 8048 further includes an 8-bit timer/counter in addition to onboard oscillator and clock circuits. Further details of this available microprocessor can be had from the MCS-48 Microcomputer User's Manual, published in 1978 by Intel Corporation. This user's manual, together with an MCS-48 assembly language reference card, published by Intel Corporation in 1978 (9800412B), are incorporated herein for reference, since certain mneumonic and operations codes thereof are given to completely illustrate a preferred embodiment of how to make and use the invention.

In the preferred embodiment, the Intel 8048 microprocessor controls display function, keyboard scan and printing of characters. A character string which is desired to be printed is first entered upon the keyboard, 14, and then immediately displayed by the LED matrix display, 16, pending actual instruction to write. Digitized versions of each character letter in a given vocabulary are addressed within a ROM memory, in order to generate a control signal which ultimately controls the x and y axis motors for sequentially plotting the desired characters. The present invention uses certain combinational logic to produce digital pulses which are ultimately converted into an analog voltage, amplified in a servo loop, if necessary, and then used to drive the DC servo motors, 24 and 26. Positional and velocity feedback information, necessary herein because of the preferred constand velocity trace sequence, can then be readily derived from the encoders which have previously been discussed, and are illustrated in FIG. 2. To appreciate the logic sequence and electrical interconnections which enable this summary of operations to be accomplished, reference will now be had to FIGS. 9–16, for both an understanding of the principles of the present invention, and to enable one to make and use the invention.

The software, which is stored within the microprocessor, performs several functions for operations which are accomplished by the above-discussed mechanical features of the keyboard unit. The keyboard, 14, includes a complete alphabet, in addition to certain other instructions, which can be summarized as follows:

| | |
|---|---|
| symbol entry | up to 32 symbols may be entered and displayed on the 32 5 × 7 dot matrix LED displays. |
| upper and lower shift key | upper and lower case versions of any given font or set. Numerals are accessible with the upper case letters. Certain symbols can be accessed with the lower shift key. |
| edit entry | clear the entire display or back spacing is provide. Backspacing allows you to edit the last entry. |
| initialization | display shows message indicating that the plotter is prepared to accept entries. |
| 5 scales | symbols can be printed in five different scales. |
| print and return | after entries have been made, the "print & return" key can be depressed. The message displayed will be printed and the pen will return to the origin after the last character is printed. As each character is being printed, the diplayed character is taken down. |
| print | after an entry has been made, depression of the "print" key will print the displayed characters, taking the displayed character down as it is being printed. The pen will not return after printing the message. This allows more entries to be made and perhaps a change of scale as well. A "print & return" key depression will return the pen to the origin. |
| no-print | "no print" allows you to estimate if your message will fit on a specific line length. The message is left on the display and the pen is disabled. The pen waits after the last character is traced for approximately 7 seconds before returning to the origin. Next the "print & return" key could be depressed and the message printed. |
| retain | the message is printed and the pen returns to the origin but the characters on the display are not taken down. The message can be printed over and over. |

Figure 9:
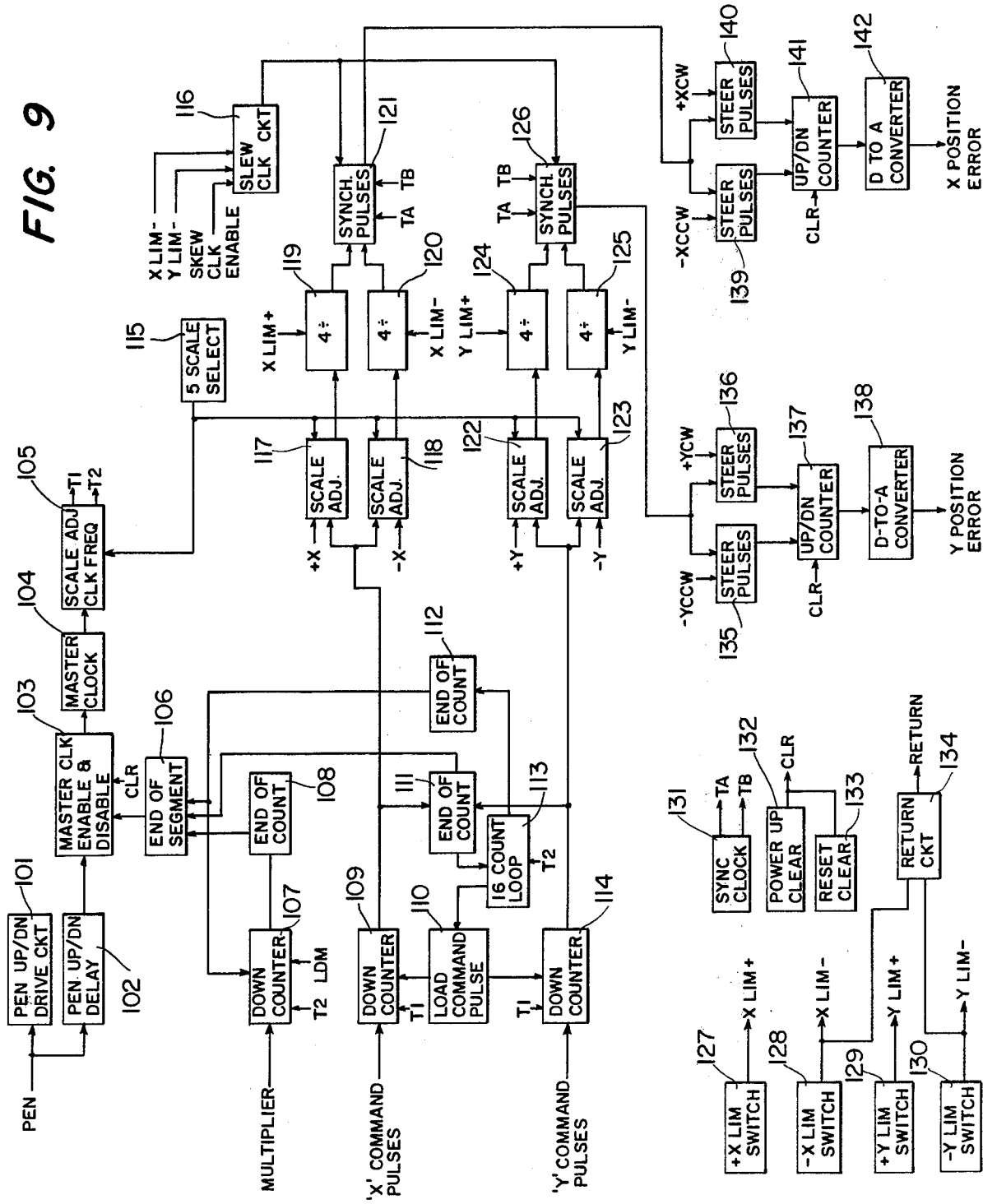
FIG. 9 is a summary of the control logic within the electronics package unit.

The above-indicated functions are, of course, not exhaustive, and are given simply to fully illustrate how to make and use a preferred embodiment of the invention. Beyond the inputs and basic functions discussed above, the software functions according to the instructions given by the microprocessor. The ultimate command signals are illustrated in FIG. 9, and will be discussed hereinafter. In order to appreciate the basic inter-relationships between the microprocessor and the other electronics of the present invention, FIG. 10 summarizes these logical inter-relationships.

Figure 10:
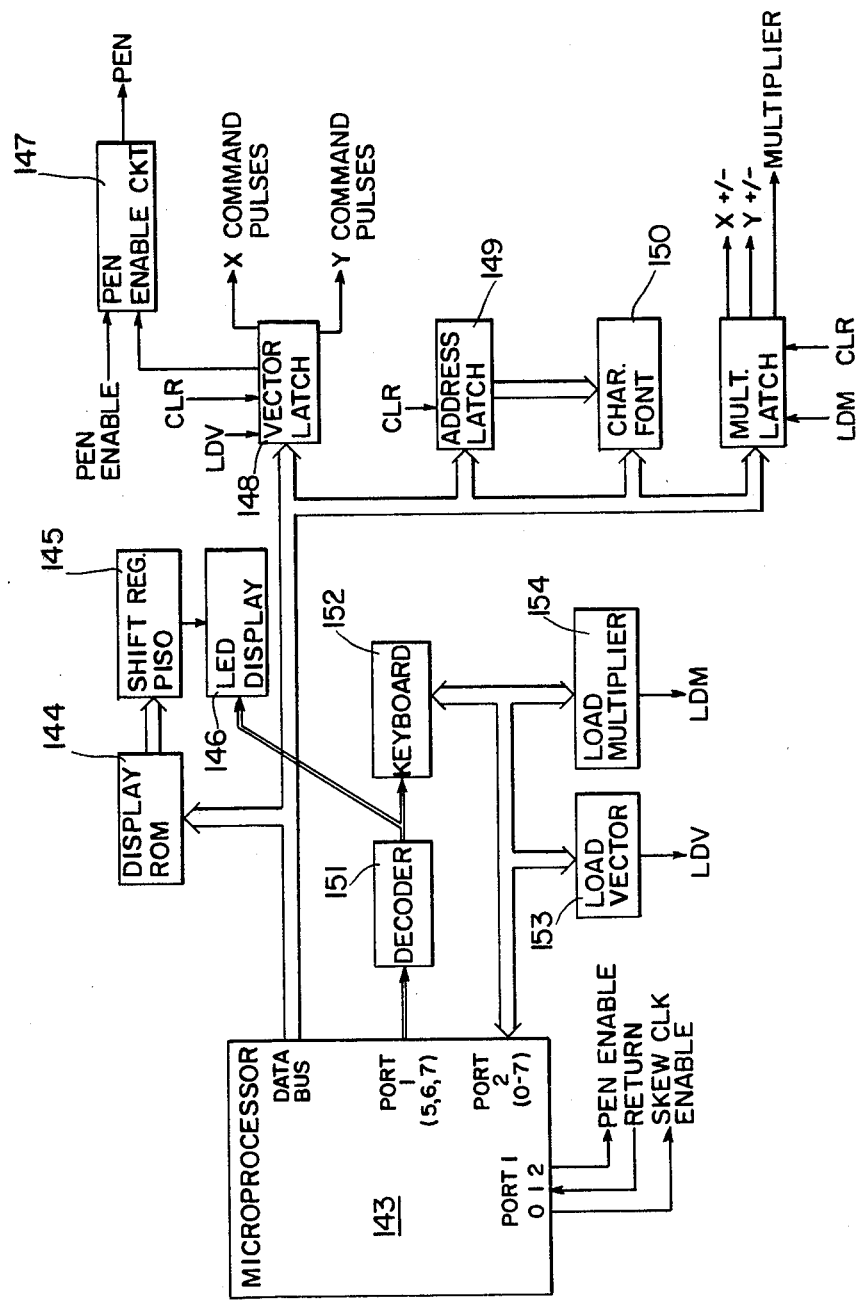
FIG. 10 is a summary of the logic interconnections of the microprocessor circuit within the electronics package unit.

FIG. 10 summarizes that during the above-discussed entry mode, one input/output port [I/O] of the microprocessor, 143, can be used to scan the rows of the keyboard, 14, while another I/O port can be used to scan the columns of the keyboard, as known. Such conventional reading of the keyboard will be further illustrated hereinafter with respect to FIG. 13, which illustrates a preferred programming of the microprocessor according to the preferred embodiment. For purposes of FIG. 10, it is sufficient to note that software is used, in a conventional manner, to detect a key depression, check for multiple key depressions, and debounce the key closures. The microprocessor, 143, deciphers the key depression and addresses an ASCII code for characters, which are then illustrated in the display ROM, 144, and simultaneously this character code is stored in the RAM memory within the microprocessor, 143. As also shown clearly in FIG. 10, the shift register, 145, inputs the ASCII code for the characters into the LED display, 146, which causes a visual representation of the input character to appear, as on the LED display, 16, of FIG. 1. Maintaining the LED display energized is accomplished in a conventional manner, by having the microprocessor refer to the RAM memory, as dictated by the program which is hereinafter summarized within FIG. 12.

Having now described the essential display function and keyboard scan operations, we will now address the commands which relate to actually drawing the requested series of characters, up to a maximum of 32 characters which have already been entered in display. Once the desired number of characters are entered, the microprocessor is commanded to print those entires, in a sequential fashion. Digitized representations of vectors required for a pen to draw each character are stored in the character font, 150, (FIG. 10), which may also be a cartridge ROM, 18, (FIG. 1). The first 256 addresses of the font are used to store the higher addresses of the block of digitized strokes required to draw a character. Two bytes are used to describe this higher address location. This method was used so that any area of the character font is accessible.

The strokes are stored in bytes of either of two kinds, a multiplier and an argument. Each byte is 8 bits long. The most significant bit of a byte identifies whether it is a multiplier or argument byte. The argument byte contains pen control and X and Y commands which are three bits long. The multiplier byte contains sign direction and multiplier information. Special coded bytes are used to indicate end of character. The multiplier can be applied to the argument byte such that the argument is repeated 2 to 63 times. These relationships can be summarized, as follows:

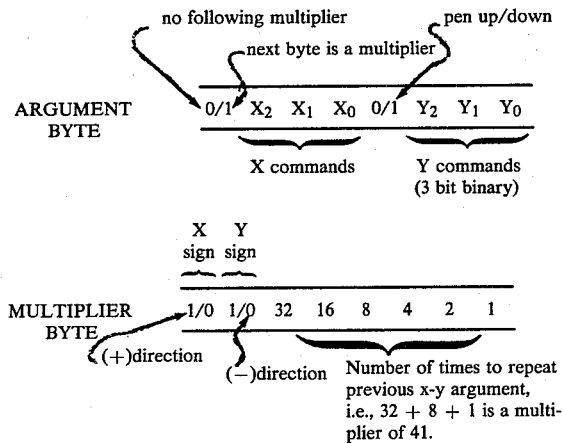

In order to actually generate these values for each letter of a given vocabulary, a master of each character is first digitized by connecting points with the slopes available on an 8×8 matrix or grid, to establish a given size vector representation by reference to, for example, the lower left hand point of the matrix as a common initial point. The font then comprises stored instructions in a ROM (read-only memory) module, which may have the capacity of 2k, 4k or even 8k bytes, depending upon the need for resolution, or number of characters in a font. The same digitized instructions may draw a character which varies, for example, within the range of from 0. to 1.0 inches in height, (i.e., the y-direction). In the digitizing process, a common base line is employed so the digitizer will be "origined" for that letter, with realization that a lower case letter may go below that base line. The x-axis, or horizontal origin of the actual writing will be at the left edge of the character, with an intercharacter space value being included in the last, or exit pen up move. This practice of digitization is not per se novel, and has been used in, for example, in prior symbol techniques as employed by Gerber Scientific, in its Model 2000 symbol sets. As noted, the font or character vocabulary includes a representation which is considered 100 percent size. With subsequent size selectivity, as by a switch on the keyboard, the pen may actually draw at, for example, 100 percent, 70 percent, 50 percent, 35 percent, and 25 percent of that full scale. In the preferred embodiments, the drawing device has a basic command resolution of 0.002 inches, with the above-identified vectors being 3 bits long for both the x and y axis. Accordingly, the maximum output vectors in the preferred embodiment is 7 times 0.002 or 0.014 inches. This maximum output vector can then be multiplied by the above-noted multiplier byte, which is available to repeat each short vector any specified number of times as desired. As also noted above, x and y axis signs are located in a byte separate from the three bit arguments, formatting multiplier bytes.

For simplicity, the preferred embodiment uses a threebit vector slope resolution which is constrained to only those slopes that connect points on an 8 by 8 grid, which represents a good fit for representation of most desired characters. A 0.014 inch maximum length, for example, for an output vector is adequate for most curve interpolations, and only infrequent use of multiplier bytes is required. If a particular character representation requires a fairly long, and straight line which is not colinear with a particular vector, a number of shorter vectors are employed to hunt about the desired slope.

When the microprocessor is commanded to PRINT, the keyboard scan is suspended, while the display refresh (FIG. 10), continues at its set rate. The PRINT sequence can be summarized by noting that the microprocessor, 143, retrieves the ASCII code from RAM and multiplies it by 2. This product is an address within the first 256 bytes of the character font. This address is the beginning location of two consecutive bytes which point to a block of strokes needed to draw this particular selected character. This block of necessary strokes is accessed from the ROM memory, and the microprocessor then fetches these access strokes byte by byte. Microprocessor first notes whether the byte is an argument or a multiplier, and the argument byte preceeds the multiplier byte. As also shown in FIG. 10, the argument byte is loaded into the vector latch, 148, wherein each bit of the argument is deciphered by combinational logic which is more particularly described hereinafter, and particularly with reference to FIG. 13.

As noted hereinbefore, FIG. 9 is a self-explanatory, control logic block diagram, which is more particularly summarized in FIG. 10. In order to fully appreciate how to make and use the present invention, a brief summary of the logic completely illustrated in the flow chart of FIG. 9 will now be given.

The logic illustrated in FIG. 9 is self-explanatory, and only a brief summary is considered necessary for a complete understanding of this preferred control logic. Numeral references to each block are employed as identifiers for each illustrated step. Starting at the pen, when a pen bit is sent to the pen up/down drive circuit (101), it is also sent to the pen up/down delay (102). X and Y axis commands are then loaded into their respective down counters (blocks 109 and 114), respectively. The sign bits will steer the x and y command pulses to their respective servo amplifiers in a manner which will become more clear with reference to the preferred software hereinafter. As soon as the pen up/down delay times out, the master clock (104) is started. The master clock frequency is adjustable by a binary rate multiplier in order to maintain a constant pen velocity for each of the scale sizes which are chosen by the scale adjust (105). As noted hereinabove, the preferred software is designed so that constant line values will result for all trace aspects of the character, and the master clock is therefore critical to maintaining constant velocities despite the particular scale chosen on the keyboard. In the preferred embodiment five scale sizes are available, as noted above. Similarly, the pulses to the dc servo motors, 24, 26 (FIG. 2) are adjusted by a certain logic, and as shown in FIG. 9 binary rate multiplier blocks (117, 118, 122 and 123) are used to correctly scale for each of five available character sizes.

As the master clock begins to count down the x and y command pulses, unscaled motor pulses thereby result for each count. When the x and y down counters reach their terminal count of zero (111) the 16 count loop (113) is decremented by one count, and the x and y commands are reloaded into their respective down counters (109 and 114). This countdown of x and y command pulses is repeated, until the 16 count loop reaches zero. At that time, if a multiplier had been loaded in the down counter (107), that multiplier is decremented one count and the x and y command pulses are reloaded to begin another 16 count down sequence, again.

When the multiplier down counter (107), the x and y down counters, and the 16 count loop reach zero, the end of segment (106) then disables the master clock (104). Accordingly, no more motor pulses are then produced. The unscaled motor pulses which are developed in the sequence described hereinabove, are then scale adjusted in binary rate multipliers (117, 118, 122 and 123) to correspond to the chosen scales desired by the operator, and these scales are appropriate for both the x and y axis instructions which ultimately are sent by the control signal. As noted above, the preferred embodiment includes five available scales, and the scale select (115), determines the amount of adjustment for each scale. These scaled motor pulses are then divided by 4 (119, 120, 124, 125) and then synchronized by clock pulses generated by the synchronizing clock (131). The purpose of the division by 4, and the synchronizing clock, is to smooth the motor pulse, as well as properly adjust the respective counts so that a position error is correctly accounted for.

The motor pulses are then steered to the proper up/down counter block (141, 137) where these pulses are down counted or up counted depending upon which way the x or y servo motors are required to rotate. The up/down counters (137, 141) have an output which loads a digital-to-analog converter (138, 142) which in turn develops the position error voltage which is proportional to the desired motor pulses.

Figure 11:
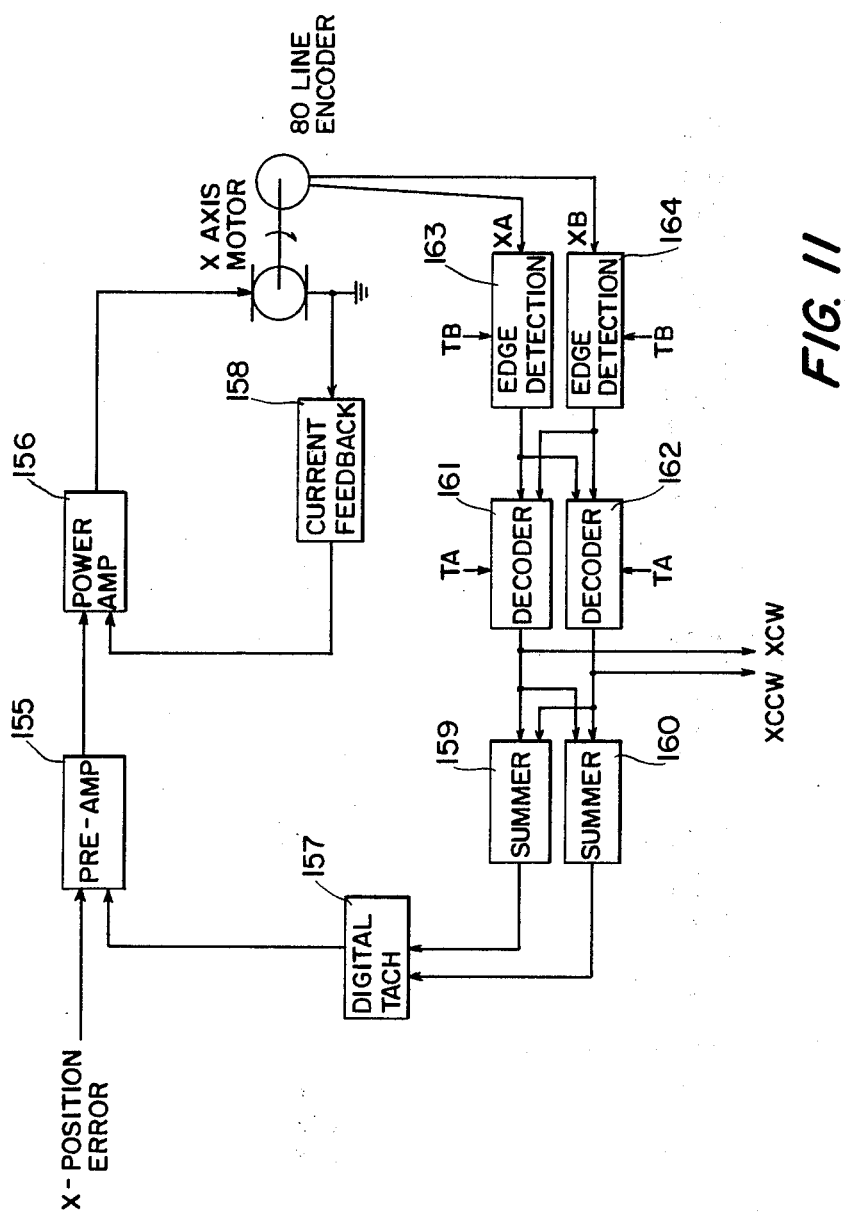
FIG. 11 is a summary of the servo amplifier control for the x-axis motor and encoder assembly.

The x position error, as well as the y position error signals may then be input into a servo amplifier, and FIG. 11 illustrates an x-axis servo amplifier which is capable of receiving the ultimate output illustrated in FIG. 9. As noted hereinabove, the x and y axis motors, and associated encoders, are substantially identical, and the y-axis servo amplifier circuit is substantially identical to the illustrated encoder for the x-axis, in FIG. 11.

FIG. 11 illustrates that the x position error signal generated is fed to a pre-amp (155) wherein velocity information is also proximately input from a digital tachometer, 157. Velocity information is developed from the encoders, with phase or quadrature of two interrupters used to determine clockwise, or counter-clockwise motion. The two photo interrupters provide pulses as the 80 line disc of the encoder interrupts a light source. The leading and trailing edges of each pulse are decoded (161, 162), in order to output proper rotational information. The 320 pulses are shown to be summed logically (at 159 and 160) and then directed to a digital tach (157), which in turn provides a velocity information output directly to the pre-amp (155). Positional pulses are taken from the output from the decoders (161, 162), at a rate of 80 lines per revolution of the lead-screw. As noted hereinbefore, with a lead-screw having 24 threads per inch, this will result in an approximate 0.0005 inch resolution for movement in the x-direction, by virtue of this selection of parameters. These pulses also provide direction of rotation information and are also used to steer the x-axis motor, all this illustrated hereinbefore at FIG. 9 (139, 140), and similarly as hereinbefore illustrated with respect to the y-axis (at 135, 136). These same pulses also coordinate motor pulses into the up/down counters, which were shown hereinbefore in FIG. 9 (141, 138).

Again with reference to FIG. 11, the preamplified motor error velocity voltage is power amplified (156), and outputted to the respective servo motor for the x-axis, as illustrated hereinbefore at 24 in FIG. 3. The illustrated embodiment herein illustrates a servo control loop which derives velocity information based upon servo motor back EMF, in that current feedback (158) is used to control motor torque. It should be noted that the servo amplifier illustrated in FIG. 11 is also essentially identical for the y-axis control. Now again with reference to FIG. 9, a power reset circuit (132) develops a clear pulse which functions to reset and clear all counters and flip-flops. This pulse also resets the microprocessor (FIG. 10), which then begins its Control Program, at program address 000. A manual reset key is also provided at the keyboard, to be used when the operation of the plotter is abnormal in any way. All counters, flip-flops, and the microprocessor are reset with the power up reset circuit (132), as shown in FIG. 9. A reset key on the keyboard, therefor, produces the necessary clear and reset pulses from a reset/clear circuit (133). Also shown in FIG. 9 are a series of limit switches, hereinbefore discussed, with the representative limit switches being represented by blocks 127, 128, 129, and 130. These limit switches are used to inhibit travel of the pen beyond the approximate 8 inch by 1 inch work area defined immediately in front of the longitudinal edge of the keyboard unit (FIG. 3). The limit switches block the motors at the divide-by-4 circuits (119, 120, 124, 125) and these switches are also employed as part of the return circuit (134). Hence, the pen is returned to an origin position by motor pulses produced by a slew clock (116), which is enabled by a signal from the microprocessor. The slew clock is disabled by respective x and y limit switches as the pen returns to the origin, as clearly illustrated at FIG. 9. At that point the microprocessor receives confirmation that the pen is at its origin, by virtue of mechanical contact to the microswitches which correspond to one of the pair of limit switches, on each axis.

The above circuitry discussion has been with reference to logical interconnections, and pursuant to 35 U.S.C. §112, first paragraph, applicants will now teach an exemplary program to allow practice of the best known mode of the invention. FIGS. 12-16, inclusive, represent a summary of a preferred programming for the Intel 8048 microprocessor which has been proven in prototype experimentation. As noted hereinbefore, this program is coded according to the Intellec prompt 48 programming scheme, and the mnemonics, and instructions may be further understood by reference to the MCS-48 Microcomputer User's Manual, available from Intel Corporation. By way of reference, each of the programming steps summarized in FIGS. 12-16 include the programming address at the bottom of a given block, and these program addresses will be referred to in making certain further comments about the written description of the preferred embodiment of the invention contained in FIGS. 12-16.

Figure 12:
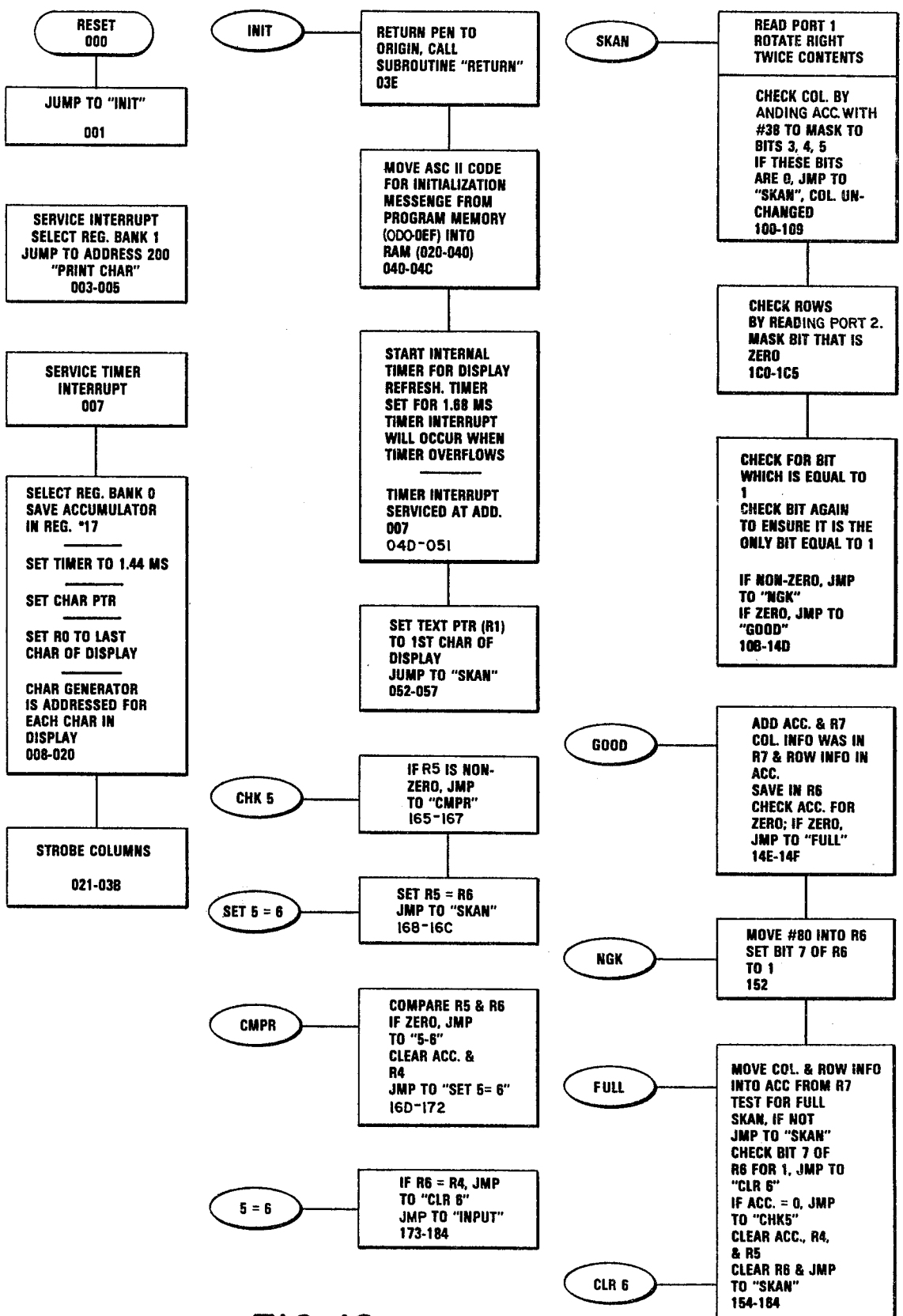
FIGS. 12–16 represent a summary of an exemplary program of the microprocessor in a preferred embodiment.

FIG. 12 represents a preliminary activity performed by the indicated program in the microprocessor. The indicated mnemonics, such as "INIT", are referrable to the assembly language definitions in the above-noted MCS-48 Microcomputer User's Manual. Each box of the flow chart represented in FIGS. 12-16 includes the appropriate program address, in hexadecimal code and directly underneath the indicated mnemonics. FIGS. 12-16 describe a preferred software sequence capable of performing the best mode of the invention, and many equivalent routines and subroutines will be suggested to one of ordinary skill.

Any time the reset button on the keyboard is pressed, there is a jump to program address 000, then to the instruction "INIT", which returns the pen to its origin location, set all flags to zero in preparation to accept further inputs. The LED display is controlled so that a proper representation will be displayed upon input (040). The LED display is maintained constant by a flickering energization, once every 1.44 milliseconds (03D and 007-03B). The text printer is prepared to print the left most character of the character string which is shown on display (052), since the printer is programmed to sequentially print the character spring starting from left to right. Of course, any other sequence is possible.

The keyboard is read by the sequence which is identified with the label SKAN. When the microprocessor is waiting for a program input, i.e., the inputting of the character by a signal from the keyboard, the program maintains itself in a cycling mode (100-184). When a key is pressed, port 2 reads the row, and port 1 reads the column, of that key so selected. Also provided is a check to make sure that only one key is being printed, at any given one time (10B-140).

In the preferred embodiment 32 characters are capable to be displayed at one time on the display, hence the operation labeled FULL ensures that no further character input will thereafter be accepted. If a non-full condition exists, the control is returned to the step labeled SKAN.

Figure 13:
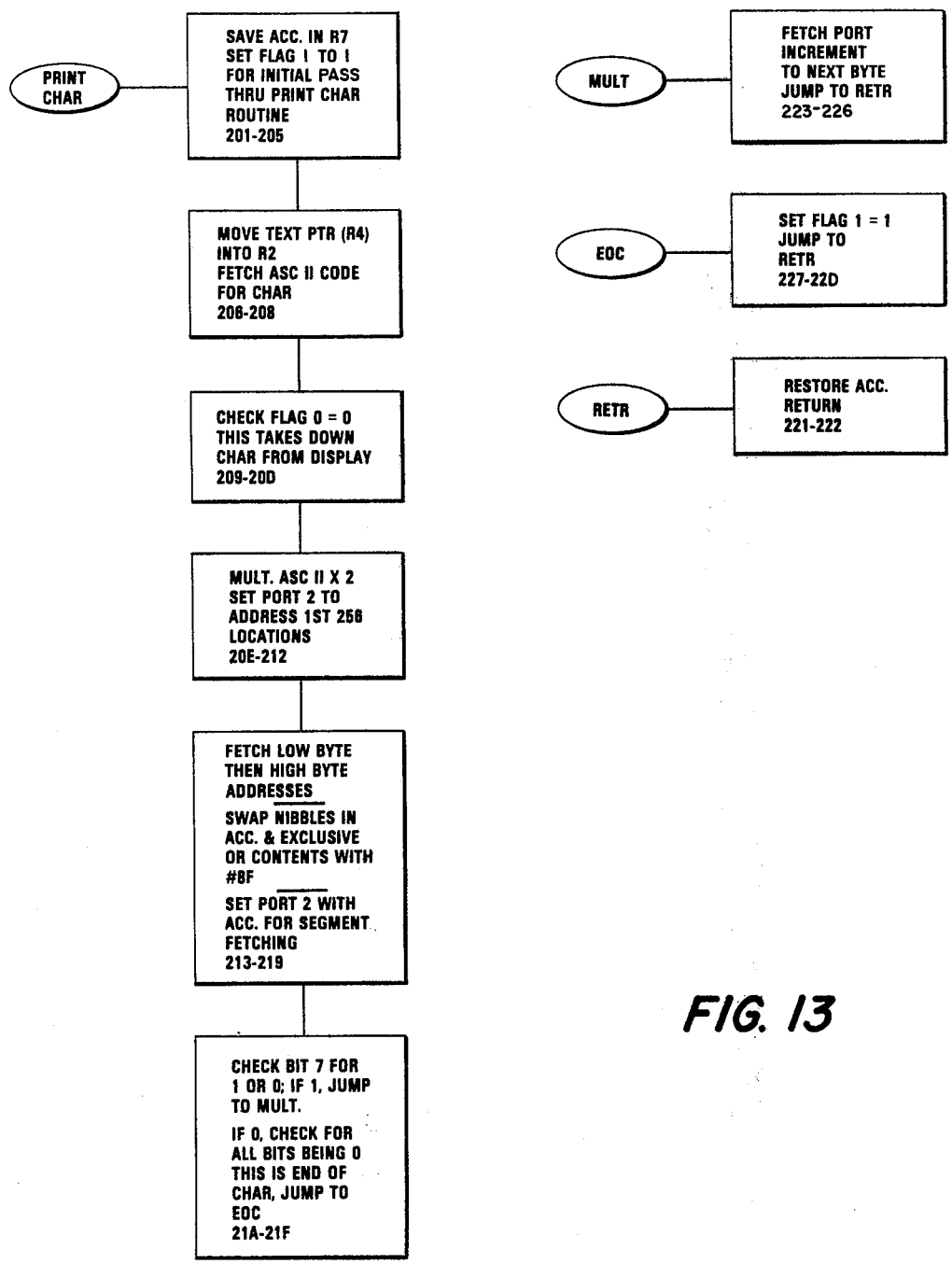
Figure 15:
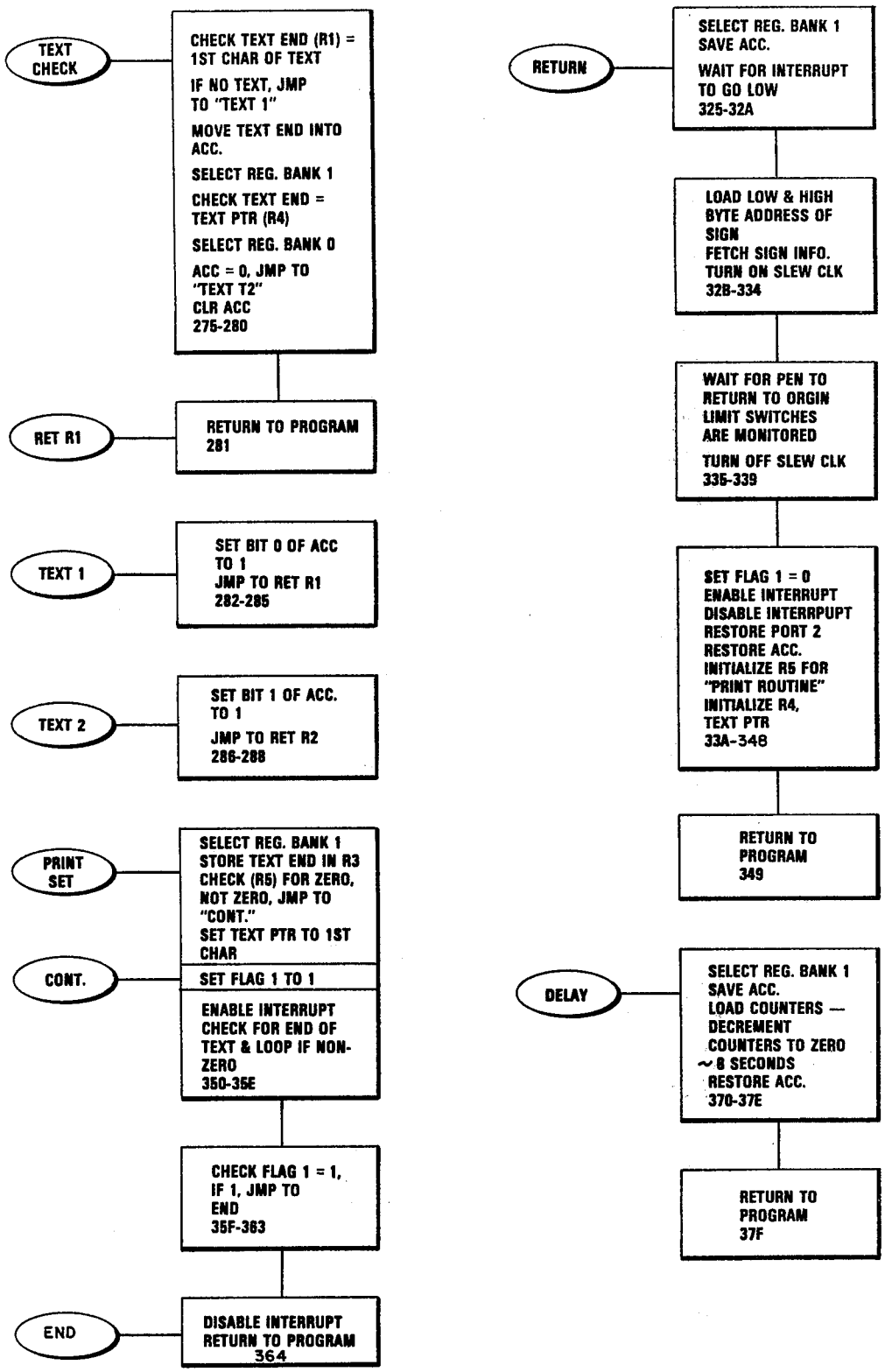
Figure 16:
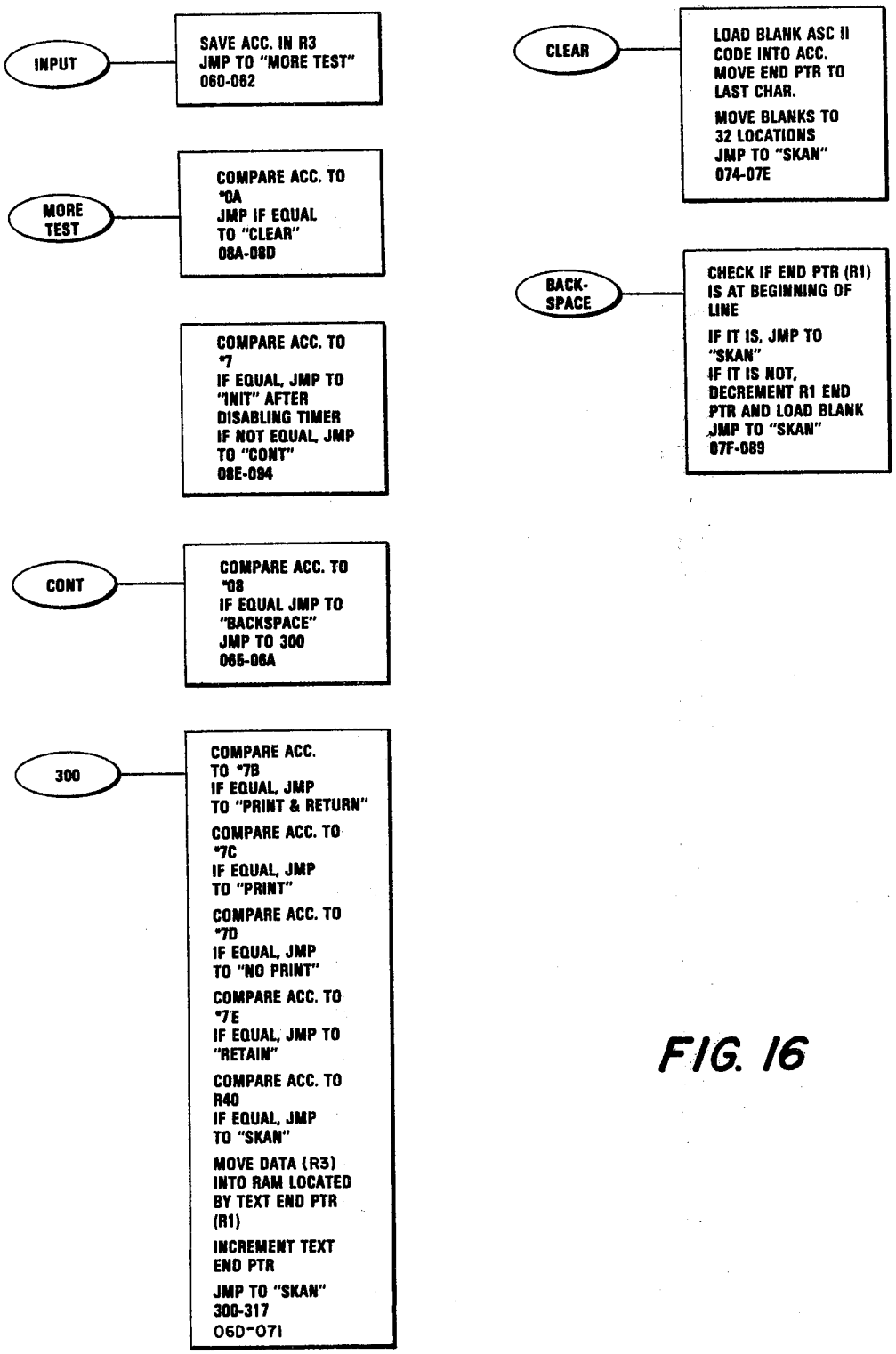

FIG. 16 illustrates further what the Control Program, or Input, actually comprises. All control keys indicated in FIGS. 12-15 branch out of the Control Program illustrated in FIG. 16. FIG. 13 illustrates the operations which begin with the label PRINT CHARACTER, which erases the left-most character on the display and proceeds to instruct the x and y axis motors with a voltage which will print the requested letter (209-20D). This operation is further illustrated to comprise looking up the instructions by multiplying the ASCII value of the selected character by the number 2, and looking at the address with that number for the address of the beginning of the instructions on plotting that particular character. Thereafter, in turn, each byte of the plotting instructions is examined. If the left-most bit is zero, i.e., an argument byte, the program will print. If the left-most bit is one, a multiplier byte follows. The direction of print is contained in the multiplier byte. The specified length is contained in the bits 0, 1, 2, 4, 5, 6 with movement along the x-axis in bits 4, 5, 6 and the distance along the y-axis being measured by bits $\phi$, 1, 2, all as hereinbefore noted in the summary of the character coding operation.

FIG. 13 also illustrates the previous discussion that if a left-most bit is a one, indicating a multiplier byte to follow, then the pen will perform the movement specified in the argument by the number of times specified in the next byte. The label "DELAY" as described hereinafter, waits for the pen to draw the segment before the pen is instructed in its next operational sequence. In the exemplary program illustrated, an end of character has been indicated by all eight bits being equal to 0. Also, a NO PRINT sequence enables the user to try out the fit of a given string, at a given size, into an available drawing space. At that juncture, control returns to the point at which entry to "PRINT CHAR" was made.

Figure 14:
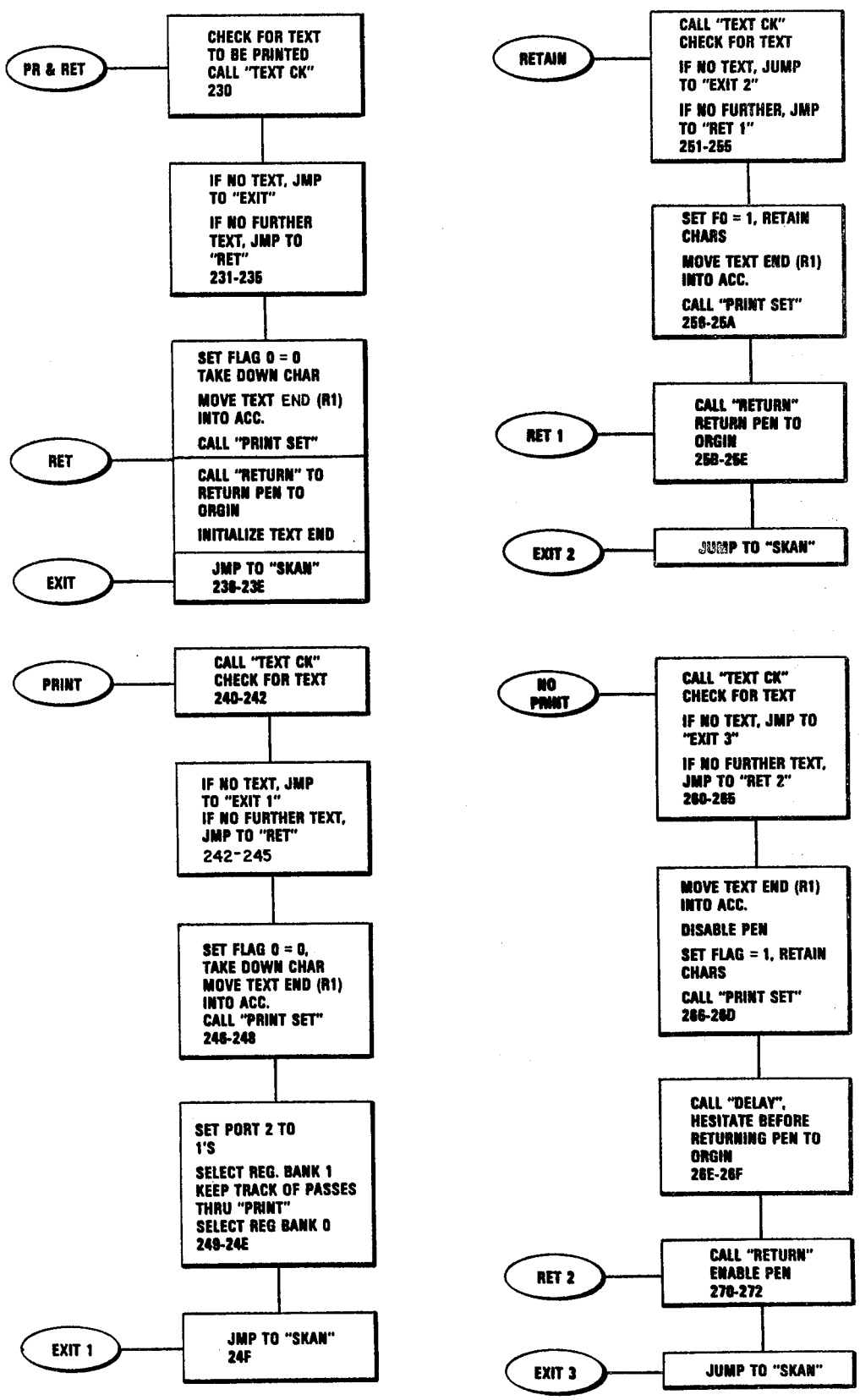

FIG. 14 continues the exemplary software with further explanations of the main entries which can represent separate keys on the keyboard. For example, "PRINT & RETURN" is different input from "PRINT" or "NO PRINT". Each of the four illustrated sub-routines of FIG. 14 can be summarized as follows, with the indicated qualifiers:

| | |
|---|---|
| 1. | Text Check determines if there is any further text or characters left to be printed at a given point in the operation. |
| 2. | If no text has been entered at a given point, the program jumps to the SKAN mode. |
| 3. | If there is no text which has not yet already been printed, the program goes to the label "RETURN", which returns the pen to the preselected origin, and also resets all counters to zero. In "NO PRINT" a delay occurs before a call to "RETURN". |
| 4. | The label TAKE DOWN functions to erase each character from the LED display, before it has been traced out by the plotter. |
| 5. | PRINT CHAR are functions above noted, for the printing sequence. |

| | -continued |
|---|---|
| 6. | The instruction for calling "PRINT SET" temporarily turns off the keyboard so that it cannot receive any further input, at that time. |
| 7. | The instruction for calling "RETURN", returns the pen to its origin and again initializes all counters and other such variables. |
| 8. | The jump to "SKAN" returns the program to the above-discussed SKAN instruction. As is further illustrated in FIG. 14, there are the instructions labeled "PRINT & RETURN", "PRINT", "RETAIN", and "NO PRINT", which are identical with the earlier meanings of these logical instructions. |

FIGS. 15 and 16 continue the program addresses. For example, label DELAY functions to allow an eight second delay, after tracing out a string (with the pen up). A further timing counter allows the pen time to trace out each character since, obviously the microprocessor's time frame is faster than the mechanical operation of the pen in executing instructions. As previously noted, FIG. 16 represents an Input Control Program, wherein the label INPUT allows the unit to accept the characters as chosen previously by the keyboard and also displayed on the LED display, including any inputted controls from the keyboard. The label CLEAR functions to erase display, then jump to the above-discussed SKAN routine.

BACKSPACE represents a sequence which allows the plotter, if already at the beginning of the line, to jump to the SKAN mode. Otherwise, BACKSPACE will erase the previous character, and reduce the variable containing length by one.

A primary advantage of the present invention is the ability to have both character vector and LED display commands contained upon a replaceable ROM cartridge, so that a given keyboard input may result in whatever that cartridge has encoded that input to represent.

The exemplary software in FIGS. 12-16 comprises the best mode presently known to applicants for carrying out the invention, and, of course, great variations upon this exemplary program are possible without departing from the spirit of the invention. Moreover, various mechanical modifications and circuitry variations are possible without departing from the spirit and scope of the present invention, which is understood to be limited solely by the scope of the appended claims.

We claim:

1. A portable alphanumeric and symbol drafting device comprising a keyboard unit in functional interconnection to an electronics package unit, wherein;

(a) Said keyboard unit further comprises a portable housing with a first longitudinal edge, a lower surface adapted to be placed on a drafting surface, and an upper surface which comprises a keyboard means for inputting at least one character or symbol; wherein further a carriage means for supporting a technical drafting pen is operably mounted for longitudinal (x) and transverse (y) movement proximate said first edge of said housing; means to move said pen carriage in said x and y directions in response to a drawing control signal which comprises a planar member having an extending guideway parallel to said longitudinal housing edge, and an x-axis servo motor and encoder assembly mounted thereon which is operable to respond to one aspect of said control signal, and selectively move said drafting pen carriage, superposed upon said planar member, in the x-direction, parallel to said longitudinal edge; wherein further said y-axis control comprises a y-axis dc servo motor and encoder assembly which is mounted to a base reference of said housing and is operable to respond to a second aspect of said control signal and move said entire planar member assembly in the y-direction, perpendicular to said longitudinal edge; means for raising and lowering said pen carriage means, in a z direction, in further response to said control signal; wherein further, (b) Said electronics package unit further comprises storing memory means for holding addressable, numerical instructions for a vocabulary of characters, means for receiving a character input from said keyboard means and communicating said input to address means for recalling numerical instructions for each of said characters from said vocabulary, means for converting said recalled numerical instructions into a drawing control signal, said converting means communicating with scale means operable to selectively change the scale of a character representation to be executed by said pen, in response to said drawing control signal and means for conveying said drawing control signal through said functional interconnection and to said keyboard unit for controlling said carriage means in said x, y and z directions.

2. A portable drafting device according to claim 1, wherein said means for inputting at least one character comprises a means for storing a plurality of inputted characters or symbols, from said keyboard means, and displaying same as an input string upon a display device, prior to responding to a print input means for instructing said drafting pen to sequentially draw each character of said string.

3. A portable drafting device according to either claim 1, wherein said storing memory means for holding addressable, numerical instructions for a vocabulary of characters, further comprises a read-only memory (ROM) with instructions for each character or symbol being separately stored in a digitalized routine represented by a plurality of coded directional vectors, wherein further a given vocabulary is combined within a cartridge-type device, which is selectively insertable into a communication with said electronics package unit.

4. A portable drafting device according to claim 3, wherein each character routine comprises a plurality of digital instructions in byte form, wherein the representation of a given character further comprises an argument byte, for x and y-axis magnitude control, and a multiplier byte, for repeating an argument byte a given number of times, wherein further said scale means selectively acts upon said digital instructions and scales said control signal to a desired character height.

5. A portable drafting device according to claim 1, further comprising a digital-to-analog converting means for converting said recalled numerical instructions into varying voltages which in turn selectively control movement of said x and y axis dc servo motors, and a z-axis control voltage to selectively control pen up/down motion, independent of x and y-axis motion.

6. A portable drafting device according to claim 1, wherein said storing memory means for holding addressable, numerical instructions for a given vocabulary of characters further comprises a read-only memory which is separable from said electronics package unit and replaceable by another read-only memory containing a different vocabulary font.

7. A portable drafting device according to claim 1, wherein said keyboard means for inputting at least one character or symbol further comprises an associated display means for indicating which characters or symbols have been input as a string, and said means for converting numerical instructions of said characters is operable to instruct said pen to sequentially trace each character in a spaced, longitudinal fashion directly upon a drafting surface proximate said first longitudinal edge of said keyboard, all in response to a print input instruction.

8. A portable drafting device according to claim 1, wherein said planar member is of a general T-square configuration and said carriage means further comprises an element which is mounted thereon for y-axis motion through a plurality of roller bearings, wherein further the means to move said carriage in the x-direction comprise an x-axis motor, fixed to said T-square, and operable to transmit a selective x-axis motion to said carriage through a rotatable lead-screw, which engages a pre-loaded nut assembly affixed to said carriage.

9. A portable drafting device according to claim 8, wherein said means to move said T-square assembly in the y-direction further comprises a y-axis servo motor which is fixed to a housing reference, and operable to transmit y-axis motion to said T-square assembly through a lead-screw that engages a pre-loaded nut assembly which is affixed to a portion of said T-square assembly.

10. An alphanumeric and symbol character drafting device characterized by a portable keyboard unit and a separate electronics package unit, said units being interconnected by an electrical connection, wherein said keyboard unit further comprises a drafting element and servo control means to translate said element in a longitudinal (x) direction, proximate a reference longitudinal edge of said keyboard unit, and independently to translate said element in a transverse (y) direction, whereby said x and y motions function sequentially to trace each of a string of input characters or symbols in response to a control signal which is generated by said electronics package unit in response to a selective input from a keyboard mounted upon the keyboard unit, wherein said electronics package further comprises memory means for storing individual character or symbol instructions corresponding to a particular character style, said memory means further comprising a read-only memory which is replaceable with a vocabulary of a different style, wherein further a given character in a given vocabulary is stored as a plurality of bytes, said bytes comprising an argument and a multiplier for respectively determining the vector magnitude of portions of a trace which comprises said character, wherein further said electronics unit comprises addressing means for receiving said selective input addressing said memory and outputting instructions for drawing each character or symbol of said string, processing means for operating upon said instructions to generate said control signal comprising both character or symbol trace and intercharacter spacing instructions, wherein said control signal is output to said servo control means which in turn controls x and y-axis motors which translate said drafting element upon the drafting surface.

11. An alphanumeric and symbol drafting device according to claim 10, wherein said processing means said control signal includes means for tracing the representation of a given character at a substantially constant velocity, regardless of scale, wherein further said control signal comprises a signal for releasing said drafting element from a normally up position to a down and writing position in a selective fashion, with resilient means for urging said drafting element with a constant force against the drawing surface during each character trace.

12. An alphanumeric and symbol drafting device according to claim 10, wherein control of the x and y motion of said drafting element further comprises an x-axis motor assembly mounted upon a planar member of a generally T-square configuration, with a carriage longitudinally translatable thereupon in response to x-axis motor rotating of a leadscrew, which engages a pre-loaded nut connected to a said carriage assembly, and a y-axis motor assembly, mounted to a keyboard housing reference, that rotates a leadscrew which engages a pre-loaded nut connected to said planar T-square member, wherein y-axis motion comprises movement of said entire T-square member upon a transversely extending guideway fixed to said housing.

13. An alphanumeric and symbol drafting device according to claim 12, wherein said drafting element comprises a technical drafting pen which is replaceably mounted within a pen holder assembly that is pivotable, in the z-direction, with respect to said carriage assembly.

14. An alphanumeric and symbol drafting device according to claim 10, wherein said processing means further comprises a scale adjustment means to convert the addressed numerical instructions, for a given character representation, into x and y control signals, said control signals further comprising pulses which are fed to servo control loops for said x and y-axis motors, wherein further signal conditioning means condition said drafting element to trace any requested character at a substantially constant velocity with substantially constant velocity traces.

15. An alphanumeric and symbol drafting device according to claim 10, wherein said keyboard unit further comprises a reference cursor which is located proximate said longitudinal edge of said housing, and which is adapted to enable the user to establish an origin for a given character string with respect to any desired location of the drafting surface upon which said keyboard unit is superposed.

16. A portable, automated drafting device for applying symbols or alphanumeric characters to the surface of a drawing or the like, comprising:

a supporting base serving as a frame of the drafting device and being sized to be manually moved by a draftsman and positioned in stationary relationship at selected locations on a drawing surface where symbols or alphanumeric characters are desired;

reference means for positioning the supporting base at the selected locations and including a reference line fixed relative to the supporting base along which symbols or alphanumeric characters may be generated at separate stations;

a first carriage supported by the base and movable relative to the base in a direction perpendicular to the reference line of the reference means;

first controlled drive motor means on the supporting base connected in driving relationship with the first carriage for controllably moving the first carriage, relative to the base, in the perpendicular direction;

a second carriage supported by the base and movable relative to the base in a direction parallel to and along the reference line of the reference means;

second controlled drive motor means connected in driving relationship with the second carriage for controllably moving the second carriage relative to the base in the direction parallel to the reference line both at and between the separate stations;

one of the carriages being mounted on the other to enable its controlled movement both parallel and perpendicular to the reference line; and a drafting implement and implement holder connected with said one of the carriages for movement with said one of the carriages, in a manner both parallel and perpendicular to said reference line, wherein the holder projects from said one of the carriages to beyond the supporting base and the reference line, at separate stations along the line, and holds the drafting implement over the drawing surface, whereby the controlled motors are operable to cause the implement to trace a given string of symbols or alphanumeric characters upon the drawing surface at any of the separate stations, without movemennt of the supporting base.

17. A portable, automated drafting device as defined in claim 16, wherein further the implement holder is movable relative to said one of the carriages, in a direction which is toward and away from the drawing surface, whereby the drafting implement may be moved into and out of contact with the surface for a selective tracing of a desired symbol or alphanumeric character.

18. A portable, automated drafting device as defined in claim 18, wherein further a keyboard assembly is mounted upon the supporting base and is operable to control the first and second controlled drive motor means for manually designating the symbols and alphanumeric characters to be traced by the drafting implement.

19. A portable, automated drafting device as defined in claim 18, wherein further a visual display is responsive to the keyboard assembly, to indicate the symbols and alphanumeric characters designated by the keyboard assembly, for each station at a desired string.

* * * * *